2,808,314

United States Patent Office

Patented Oct. 1, 1957

2,808,314
METHOD OF MAKING MOLDED BORON NITRIDE BODIES

Kenneth M. Taylor, Lewiston, N. Y., assignor to The Carborundum Company, Niagara Falls, N. Y., a corporation of Delaware No Drawing. Application May 17, 1952, Serial No. 288,553

3 Claims. (Cl. 23—191)

This invention relates to the manufacture of molded shapes of boron nitride. It further concerns a process for the preparation of a boron nitride material which is particularly adaptable for the molding of shaped articles as well as to methods of forming the material into the desired shapes by hot or cold molding. It also pertains to the articles made therefrom.

Boron nitride as a material is not new. The literature is replete with suggestive methods for the manufacture of boron nitride as a material. However, heretofore it has been a generally accepted fact that boron nitride per se cannot be molded into articles of various shapes without the use of an extraneous bonding agent since attempts to mold the boron nitride alone into various shapes has invariably resulted in the formation of bodies which were soft and of such low mechanical strength that they were readily broken or crumbled.

It is therefore an object of the present invention to provide an improved method for making boron nitride material.

It is a further object of the present invention to provide a boron nitride material which has improved molding properties.

It is a further object to provide a method of making boron nitride articles without the use of extraneous bonding substances.

It is a still further object to provide molded self-bonded boron nitride articles having satisfactory mechanical strength.

It is a further object to provide boron nitride articles of greater density and hardness than articles heretofore made of the same material.

It is a still further object to provide hot molded boron nitride bodies which are resistant to attack by water.

Other objects and advantages accruing from the present invention will become obvious as the description proceeds.

I have found that boron nitride of highly satisfactory molding properties can be made by mixing boric oxide or its equivalent in boric acid and tricalcium phosphate and heating the mixture in an atmosphere of ammonia at a controlled temperature around 900° C. for several hours. I have found that if the nitriding operation is carried out at too high a temperature the resulting boron nitride material cannot be satisfactorily hot pressed, and if the nitriding is done at too low a temperature the resulting product is too soluble in acids and cannot be satisfactorily separated from the other products of the reaction. The temperature of nitriding, therefore, should be maintained around 900° C. for optimum results, although a reasonable variation in temperature can be tolerated, such as between 800° C. and 1100° C. The mixture of raw materials is preferably pelletized by moistening with water and forming into porous pellets or agglomerates such as by forcing the moistened mixture through a coarse mesh screen and drying prior to the nitriding operation. The reaction product is crushed and treated with acid to remove the tricalcium phosphate or other extraneous material, washed and filtered, followed by a final washing with 95% alcohol.

Boron nitride material satisfactory for molding shaped bodies of boron nitride can also be made by a process similar to that already described but in which, instead of mixing the boric acid or boric oxide with tricalcium phosphate, the boric acid or boric oxide is mixed with previously made boron nitride. This latter process avoids the requirement of an acid treatment.

The resulting boron nitride made by either of the above-described processes can be molded into various shapes without the use of an extraneous bond by either a cold molding or hot molding procedure. Articles have been made therefrom by a hot molding process wherein the boron nitride is placed in a graphite mold and simultaneously subjected to heat and pressure to compress the material to the desired final shape, the temperature being maintained between 1500° C. and 1900° C. at a pressure of at least 250 pounds per square inch. If desired, in hot molding the desired shapes the furnace chamber can be flushed with nitrogen or helium to provide a controlled non-oxidizing or inert atmosphere during the firing operation. It has been found that when temperatures above 1900° C. are used the resulting articles tend to lose their hardness. As I have indicated above, articles have been satisfactorily hot molded in a graphite mold at temperatures of 1500° C. to 1900° C. in which no attempt has been made to control the atmosphere beyond the fact that the carrying out of the molding operation in a graphite mold can be reasonably assumed to provide a non-oxidizing carbonaceous atmosphere. Articles have been similarly hot molded with satisfactory results by maintaining a controlled non-oxidizing atmosphere throughout the firing schedule by flushing with and maintaining an atmosphere of nitrogen or helium in the furnace chamber at all times in order to avoid the presence of oxygen. Regardless of whether such a controlled inert and non-oxidizing atmosphere is maintained during firing or whether the normal non-oxidizing conditions set up by firing in a graphite mold and chamber is relied upon to exclude oxygen, I have found that the resulting hot-molded boron nitride bodies contain an unidentifiable material soluble in absolute alcohol.

I have further discovered that the resistance of the resulting hot molded shapes to damage by water can be increased by the addition of a small amount of finely divided tricalcium phosphate to the powdered boron nitride from which the article is hot molded.

Alternatively, various shapes have been made from the boron nitride material made as hereinabove described by cold molding the material at high pressures in the order of 10,000 to 30,000 pounds per square inch and subsequently heating the molded shapes to a temperature of around 1400° C. in an atmosphere of ammonia.

In order that the invention may be more fully understood, the following specific example illustrates the manner in which boron nitride has been made for use in accordance with the present invention.

5320 grams of a commercial grade of boric acid (equivalent to 3,000 grams of boric oxide) and 3,000 grams of precipitated tricalcium phosphate, commercial grade, were thoroughly dry mixed. The mixture was made into a stiff paste by the addition of approximately 4000 ml. of tap water and then pelletized or agglomerated by pressing through a 4-mesh sieve. The resulting small agglomerates of material were dried for two hours at 200° F. followed by drying for three hours at 320° F. The dried pellets were then nitrided by heating in an atmosphere of ammonia in a silicon carbide-lined electric muffle furnace for nine hours at 900° C. The flow of ammonia gas was maintained throughout the nitriding operation at a rate of flow of approximately one liter of ammonia per minute per 1200 grams of material.

After nitriding, the pellets were ground to a sufficient fineness to pass through a 60-mesh screen and then treated with dilute hydrochloric acid to dissolve the tricalcium phosphate and other extraneous material. The dilute hydrochloric acid was prepared by mixing five liters of concentrated acid and seventeen and one-half liters of water. The material was kept in the hydrochloric acid, with occasional stirring, for eight hours. It was then allowed to stand overnight to settle the undissolved boron nitride, after which the acid solution was decanted off and a mixture of two liters of concentrated hydrochloric acid and ten liters of water added and occasionally stirred for three hours. After standing for a few hours to allow the solids to settle, the acid solution was decanted off. The undissolved boron nitride was washed several times by decantation with tap water and then with distilled water. The solids were filtered on a Buchner funnel, washed several times with hot 95% alcohol and dried overnight at room temperature followed by a final drying at 300° F. for two hours.

A typical analysis of the recovered boron nitride is as follows:

ANALYSIS OF BORON NITRIDE

Constituent: Amount, percent
Boron ----------------------------------- 41.45
Nitrogen -------------------------------- 55.60
Free boric acid [1] (calculated as $H_3BO_3$) ---- .75
Silica ---------------------------------- .28
Calcium --------------------------------- trace
Phosphate ($PO_4$) ---------------------- trace
Material volatile at 110° C ------------- .26

[1] Probably present as a mixture of acids such as $HBO_2$, $H_2B_4O_7$ and $H_3BO_3$.

The resulting material was identified as boron nitride by X-ray diffraction analysis, no other lines than those of boron nitride being found in the diffraction pattern. The material so made is a finely divided, bulky, white powder and electron micrographs of the material indicate that the individual crystals are 0.5 micron and finer in size. The crystal size and chemical inertness increase on heating to higher temperatures. The material has a specific gravity of about 2.21.

In treating the nitrided material with hydrochloric acid to remove tricalcium phosphate and other extraneous material in the above process it is important that the acid be dilute. Strong acid seems to dissolve a part of the boron nitride. For example, when small agglomerates or pellets of boric acid and tricalcium phosphate of the above composition were nitrided as described above and subsequently treated with a mixture of one part of concentrated hydrochloric acid and one part of water, the yield of boron nitride was only 21% of the theoretical.

Having made a quantity of the powdered boron nitride material according to the process set forth above, small shapes such as cylinders 1¼" long and ⅞" diameter were made by hot pressing as follows:

An Ajax high frequency electric furnace was used for hot pressing. It had a graphite crucible heating chamber which was cylindrical in form, with an inside diameter of 4" and a length of about 11". The top of the crucible during use was closed by a graphite block and powdered carbon except for an opening ½" in diameter through which temperature readings were made and an opening through which a graphite mold plunger passed. Since the heating chamber was graphite, the furnace chamber was considered to be in a reducing atmosphere at high temperatures, consisting chiefly of carbon monoxide and nitrogen.

The boron nitride material was pressed in cylindrical graphite molds with inside diameters up to 1". Each mold had two movable graphite plungers. The boron nitride in a loose powdered condition was placed in the mold by compressing slightly as the mold was filled. Pressure was applied to the plungers and maintained throughout the heating and cooling periods. Table I below shows the typical effect of the variation of pressure in hot pressing boron nitride at constant temperature.

Table I

EFFECT OF VARIATION OF PRESSURE ON HOT PRESSING BORON NITRIDE AT 1500° C.

| Piece No. | Pressure, p. s. i. | Apparent Density, g./cc. | Sandblast Penetration,[1] inches |
|---|---|---|---|
| 1 | 1,000 | 2.01 | .002 |
| 2 | 500 | 2.01 | .002 |
| 3 | 250 | 1.87 | .002 |
| 4 | 125 | 1.62 | .013 |

[1] Standard penetration on plate glass when subjected to the same penetration test is .010 of an inch.

It was found that best results were obtained with the use of a pressure in the neighborhood of 400 pounds per square inch or higher although articles of satisfactory hardness and strength were obtained by the use of pressures as low as 250 p. s. i. Articles pressed at pressures below 250 p. s. i. were considerably softer and of much lower density.

Maximum or peak temperatures ranging from 1500° C. to 2200° C. were tried. It required about 1¼ to 1¾ hours to reach maximum temperature which was then held until there was no further downward movement of the plunger, thereby indicating that the article had been compressed to the maximum density for that temperature and pressure. With a pressure of 500 pounds per square inch, no holding period was usually required at temperatures of 1900° C. or higher, while at 1500° C. the holding period was around twenty minutes.

Strong, hard specimens of hot pressed boron nitride were obtained in the temperature range of 1500° C. to 1900° C. Within these limits the optimum temperature peak, using a pressure of around 500 pounds per square inch, appeared to vary somewhat with the particular batch of boron nitride. Thus, for example, one batch, when pressed at 1500° C. and 500 pounds per square inch had an apparent density of 2.01. Another batch, pressed at the same temperature and pressure, attained an apparent density of only 1.63 but when pressed at 1800° C. and 500 pounds per square inch the apparent density was 1.98. The hardness of the hot pressed pieces increases with density. At 1900° C., most of the hot pressed bodies had a relatively soft outside layer about ¹⁄₃₂" thick but were strong and hard under this layer. At 2100° C., only the core of the sample was hard, while at 2200° C. the entire specimen was relatively soft. The tendency of the soft outside layer to become thicker as the temperature is increased above about 1800° C. is shown by the data in Table II below which sets forth the successive sandblast penetrations on bodies made by pressing boron nitride as herein made and as described above at various temperatures:

Table II

EFFECT OF THE TEMPERATURE OF PRESSING ON THE SANDBLAST PENETRATION OF HOT PRESSED BORON NITRIDE BODIES

| Maximum temperature of hot pressing, ° C. | Successive sandblast [1] penetrations taken in the same spot, inches |
|---|---|
| 1,500 | .004, .002, .001 |
| 1,800 | .003, .004, .004 |
| 1,900 | .029, .012, .010 |
| 2,100 | .100, .100, .010 |
| 2,200 | .100, .100, .100 |

[1] Standard penetration on plate glass, using the same test, was .010 of an inch.

Bodies of boron nitride hot pressed in the temperature range of 1500° C. to 1900° C. and at 500 pounds per square inch in accordance with the procedure set forth above are white and have an ivory-like appearance and a smooth, graphite-like feel. They are readily machinable and for a ceramic material are quite strong in compression. The compressive strength at room temperature of a representative body was found to be 54,000 pounds per square inch. The apparent density averages about 1.98 grams per cc. The Knoop hardness (K100) taken on a typical sample was found to be 68. The bodies have good resistance to oxidation and thermal shock. Test pieces of bodies so made when subjected to a load test for one hour at 1200° C. underwent no slumping. The load test consisted of heating a cube of the material to 1200° C. at the rate of 200° per hour under a load of 60 pounds per square inch and holding the material at the maximum temperature under load for one hour followed by gradual cooling to room temperature. Specimens 1½"x½"x½" in size were subjected to a heat shock test in which the pieces were placed in a furnace at a temperature of 1850° F. and held until the specimens had reached the temperature of the furnace chamber. The test pieces were then removed and cooled with a blast of air to a dark color. The heating and cooling was repeated through 25 cycles, the heating requiring about three minutes and the cooling about one minute. When subjected to such treatment for heat shock resistance the bodies made as described above underwent 25 cycles at 1800° F. followed by an additional 25 cycles at 2200° F. without developing cracks or otherwise showing signs of failure.

An alternative method of forming shaped articles from the above boron nitride material is by heating the compressed material in ammonia at approximately 1400° C. under atmospheric pressure. For example, small test pieces and other articles have been made as follows:

To 6 grams of boron nitride were added .3 gram of "Carbowax" No. 4000 dissolved in .6 cc. of benzene. "Carbowax" No. 4000 is the trademark for a polyethylene glycol composition made by Carbide and Carbon Chemicals Corporation, 30 East 42nd St., New York 17, New York. The mixture was ground in a mortar until the benzene had evaporated, leaving the "Carbowax" as a temporary binder. The mix was pressed into a bar 1½"x½"x¼" at a pressure of 30,000 pounds per square inch. The resulting bar was then fired in an atmosphere of ammonia for a total of approximately 16 hours with a temperature of 1350° C. to 1450° C. In firing, the bar increased in strength and hardness. The sandblast penetration (plate glass equalling .010") of the body after firing approximately 16 hours was .021". For purposes of comparison, the sandblast penetration on a sample of graphite electrode material was .025" and that on a carbon insert for a solid propellant rocket motor was .039". The resulting bar when soaked in water failed to disintegrate after a period of seven days.

Boron nitride bodies of the present invention show no evidence of instability in air after several months' aging although the hot pressed bodies do tend to disintegrate when soaked in water. The stability in air may be attributed partly to the dense character of the material and also to the possibility that a thin film of boric oxide may be formed on the outside of the body protecting the interior from further hydration in air. I have found however that the stability against disintegration of the hot pressed bodies when soaked in water can be markedly increased by the incorporation of from 5–10% of tricalcium phosphate to the boron nitride pressing mixture. It is also found that the inclusion of small amounts of tricalcium phosphate in the pressing mixture of boron nitride reduces the amount of alcohol soluble material in the pressed body. Table III below shows the extent to which the tricalcium phosphate reduces the amount of alcohol soluble material in the piece.

Table III

| Sample No. | Composition before hot pressing, percent by Weight | Content of alcohol-soluble material (calculated as $B_2O_3$) after hot pressing, percent by Weight |
|---|---|---|
| 1 | 100 BN | 15 to 20 |
| 2 | 95 BN; 5 $Ca_3(PO_4)_2$ | 5.6 |
| 3 | 90 BN; 10 $Ca_3(PO_4)_2$ | 0.63 |

Examination of the resulting hot pressed boron nitride bodies under the electron microscope at high magnifications indicates that the size of the crystals which in the unmolded boron nitride material appeared to be in the neighborhood of .5 micron and smaller had greatly increased to the point where the individual crystals were in the neighborhood of 10 microns and even as high as 20 microns in size. In view of the definite growth in the crystal size of the boron nitride which takes place during hot pressing it is believed that the strength of the article is obtained at least in part because of the interlocking of crystals caused by this crystal growth and possible recrystallization of the boron nitride.

I have set forth herein the exact conditions and requirements for making a boron nitride material which can be either hot pressed, or cold pressed and sintered, as well as the exact steps and conditions to follow to carry out successfully the hot pressing, or cold pressing and sintering, of boron nitride bodies. In setting forth those various conditions and requirements a number of heretofore unknown and unrecognized factors which are highly critical to a satisfactory carrying out of the present invention, namely, the molding of bonded boron nitride bodies of acceptable strength and hardness have been pointed out. For example, I have discovered that when the boron nitride material is formed that it is essential that the temperature of formation be closely controlled and kept at a relatively low temperature in the neighborhood of 900° C. or thereabouts since the formation of boron nitride at higher temperatures results in the formation of a material which is unsatisfactory for the hot pressing, or cold molding and sintering, of boron nitride bodies. I have further observed and explained that when boron nitride bodies are to be molded by hot pressing operations the temperature of molding should be below 1900° C. since bodies molded at higher temperatures are soft and weak. It has been further explained wherein the stability of boron nitride bodies which are hot molded can be increased remarkably by the addition of small amounts of tricalcium phosphate to the boron nitride from which the article is molded. I have further indicated herein that the boron nitride bodies as herein made are to some extent soluble in alcohol, even though those bodies are deliberately compressed and fired in controlled non-oxidizing atmospheres obtained by flushing the furnace chamber with helium or nitrogen during the firing operation. Despite such precautions I have found the resulting bodies to contain an unidentified alcohol soluble material. I am unable to offer any satisfactory explanation as to why the hot molded boron nitride bodies are more or less alcohol soluble or why this alcohol solubility can be modified by the introduction of small amounts of tricalcium phosphate and also by the controlling of the temperature of formation of the boron nitride material and/or the regulation of the temperature of molding the final bodies. I have been unable to establish by X-ray diffraction analysis methods or by methods using a petrographic microscope the identity of any material other than boron nitride in the final bodies.

Having described the invention in detail, it is desired to claim:

1. A method of making boron nitride bodies which comprises heating a mixture of boric acid and tricalcium phosphate in an atmosphere of ammonia to a temperature of 800° C. to 1100° C. for several hours to nitride the boric acid and form boron nitride consisting predominantly of individual crystals of boron nitride in the order of .5 micron crystal size, separating the boron nitride from the resulting product, placing the boron nitride in a mold and hot pressing at a temperature of 1500° C. to 1900° C. at a pressure of at least 400 pounds per square inch to form a boron nitride body having an apparent density of about 2.

2. A method of making boron nitride bodies which comprises heating a mixture of boric acid and previously formed boron nitride in an atmosphere of ammonia to a temperature of 800° C. to 1100° C. for several hours to nitride the boric acid and form boron nitride consisting predominantly of individual crystals of boron nitride in the order of .5 micron crystal size, separating the boron nitride from the resulting product, placing the boron nitride in a mold and hot pressing at a temperature of 1500° C. to 1900° C. at a pressure of at least 400 pounds per square inch to form a boron nitride body having an apparent density of about 2.

3. A method of making boron nitride bodies which comprises heating a mixture of boric acid and an inactive diluent selected from the group consisting of tricalcium phosphate and previously formed boron nitride in an atmosphere of ammonia to a temperature of 800° C. to 1100° C. for several hours to nitride the boric acid and form boron nitride consisting predominantly of individual crystals of boron nitride in the order of .5 micron crystal size, separating the boron nitride from the resulting product, placing the boron nitride in a mold and hot pressing at a temperature of 1500° C. to 1900° C. at a pressure of at least 400 pounds per square inch to form a boron nitride body having an apparent density of about 2.

References Cited in the file of this patent

UNITED STATES PATENTS

| | | |
|---|---|---|
| 1,420,980 | Eichenberger | June 27, 1922 |
| 1,464,292 | Peacock | Aug. 7, 1923 |
| 1,656,572 | Schultze | Jan. 17, 1928 |
| 1,842,103 | Laise | Jan. 19, 1932 |
| 2,436,771 | Hood | Feb. 24, 1948 |
| 2,463,404 | McKinley | Mar. 1, 1949 |
| 2,568,157 | Lepp et al. | Sept. 18, 1951 |
| 2,606,815 | Sowa | Aug. 12, 1952 |

FOREIGN PATENTS

| | | |
|---|---|---|
| 483,201 | Great Britain | Apr. 13, 1938 |